(12) United States Patent
Kim et al.

(10) Patent No.: US 9,140,842 B2
(45) Date of Patent: Sep. 22, 2015

(54) DISPLAY DEVICE

(71) Applicant: Samsung Display Co., Ltd., Yongin, Gyeonggi-Do (KR)

(72) Inventors: Jung Hyun Kim, Seoul (KR); Hee-Kwang Song, Suwon-si (KR); Seokhyun Nam, Seoul (KR); Juyoung Yoon, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 85 days.

(21) Appl. No.: 14/140,760

(22) Filed: Dec. 26, 2013

(65) Prior Publication Data

US 2015/0023057 A1    Jan. 22, 2015

(30) Foreign Application Priority Data

Jul. 22, 2013    (KR) .......................... 10-2013-0086206

(51) Int. Cl.
*G02B 6/00*    (2006.01)
*F21V 8/00*    (2006.01)

(52) U.S. Cl.
CPC ............ *G02B 6/0011* (2013.01); *G02B 6/0055* (2013.01); *F21V 2200/20* (2015.01)

(58) Field of Classification Search
CPC .... F21V 2200/20; G02B 6/00; G02B 6/0001; G02B 6/0011; G02B 6/0013; G02B 6/0015; G02B 6/0018; G02B 6/0031; G02B 6/0033; G02B 6/0055
See application file for complete search history.

(56) References Cited

U.S. PATENT DOCUMENTS

| | | | |
|---|---|---|---|
| 2010/0253872 A1 | 10/2010 | Park et al. | |
| 2010/0271841 A1* | 10/2010 | Kim | 362/607 |
| 2012/0063168 A1* | 3/2012 | Nambu et al. | 362/609 |
| 2012/0087148 A1* | 4/2012 | Chiu et al. | 362/607 |
| 2012/0120678 A1* | 5/2012 | Su | 362/607 |

FOREIGN PATENT DOCUMENTS

| | | |
|---|---|---|
| KR | 1020060102870 A | 9/2006 |
| KR | 1020110014305 A | 2/2011 |
| KR | 1020120067550 A | 6/2012 |
| KR | 1020120129092 A | 11/2012 |
| KR | 1020130011404 A | 1/2013 |

\* cited by examiner

*Primary Examiner* — Karabi Guharay
*Assistant Examiner* — Nathaniel Lee
(74) *Attorney, Agent, or Firm* — Cantor Colburn LLP

(57) ABSTRACT

A display device includes a display panel, a light guide plate which is disposed under the display panel and includes a first side surface, a second side surface connected to one end of the first side surface, and a third side surface connected to the other end of the first side surface, a first light source disposed to face the first side surface and including a plurality of light emitting devices including a first light emitting device to emit a first color light and a second light emitting device to emit a second color light, and a first reflecting member disposed on the second side surface and having a complementary color to a color of the light emitted from a light emitting device, which is disposed closest to the one end of the first side surface, among the plurality of light emitting devices.

20 Claims, 11 Drawing Sheets

DISPLAY DEVICE

This application claims priority to Korean Patent Application No. 10-2013-0086206, filed on Jul. 22, 2013, and all the benefits accruing therefrom under 35 U.S.C. §119, the contents of which are hereby incorporated by reference in its entirety.

BACKGROUND

1. Field

The invention relates to a display device. More particularly, the invention relates to a display device having improved display quality.

2. Description of the Related Art

In general, a non-self emissive display device, e.g., a liquid crystal display device, generates an image using light provided from a separate light source, e.g., a backlight unit. The backlight unit includes a plurality of light emitting units that emits the light. Each of the plurality of light emitting units includes a plurality of light emitting devices.

The plurality of light emitting units includes light emitting devices that generate different colors. The plurality of light emitting units combines the different colors and emits lights having various colors.

SUMMARY

The invention provides a display device having a uniform brightness and improved display quality.

Exemplary embodiments of the invention provide a display device including a display panel, a light guide plate which is disposed under the display panel and includes a first side surface, a second side surface connected to one end of the first side surface, and a third side surface connected to the other end of the first side surface, a first light source disposed to face the first side surface and including a plurality of light emitting units each including a first light emitting device to emit a first color light and a second light emitting device to emit a second color light, and a first reflecting member disposed on the second side surface and having a complementary color to a color of the light emitted from a light emitting device, which is disposed closest to the one end of the first side surface, among the plurality of light emitting devices.

In an exemplary embodiment, the first light source may combine the first color light and the second color light to generate a white color light. The first color light may be a green color light and the second color light may be magenta light.

In an exemplary embodiment, the display device may further include a second reflecting member disposed on the third side surface and having a complementary color to a color of the light emitted from the light emitting device, which is disposed closest to the other end of the first side surface, among the light emitting devices.

In an exemplary embodiment, the light emitting device disposed closest to the one end of the first side surface and the light emitting device disposed closest to the other end of the first side surface may emit the lights having the same color.

In an exemplary embodiment, the first light emitting device may be disposed closest to the one end of the first side surface and the second light emitting device may be disposed closest to the other end of the first side surface.

In an exemplary embodiment, each of the light emitting units may further include a third light emitting device that emits a third color light different from the first and second color light.

In an exemplary embodiment, the first light source may combine the first color light, the second color light, and the third color light to generate a white color light.

In an exemplary embodiment, the first reflecting member may be extended from a portion of the second side surface, which is connected to the first side surface, to partially cover the second side surface.

In an exemplary embodiment, the display device may further include a second light source including a plurality of light emitting units. The light guide plate further includes a fourth side surface connected between the second side surface and the third side surface to face the first side surface, and the second light source is disposed to face the fourth side surface.

In an exemplary embodiment, the first reflecting member may be divided into a portion disposed adjacent to the first side surface and a portion disposed adjacent to the fourth side surface.

Exemplary embodiments of the invention provide a display device including an optical member, a display panel disposed on the optical member, and a light source disposed under the optical member and including a first light emitting device to emit a first light having a first color and a second light emitting device to emit a second light having a second color.

In an exemplary embodiment, the optical member may include a diffusion member and a reflecting member including a first reflecting portion disposed along an edge of the diffusion member to correspond to the first light emitting device and having a complementary color to the first color of the first light and a second reflecting portion disposed along the edge of the diffusion member to correspond to the second light emitting device and having a complementary color to the second color of the second light.

In an exemplary embodiment, the first reflecting portion and the second reflecting portion may be alternately arranged with each other.

In an exemplary embodiment, the light source may combine the first light having the first color and the second light having the second color to generate a white color light. The first color may be a green color and the second color is a magenta color.

In an exemplary embodiment, the light source may further include a third light emitting device to emit a third light having a third color different from the first and second colors, and the light source may combine the first light having the first color, the second light having the second color, and the third light having the third color to generate a white color light.

In an exemplary embodiment, each of the first light emitting device and the second light emitting device may be provided in a plural number, and each of the first light emitting devices may be disposed between the second light emitting devices.

In an exemplary embodiment, the reflecting member may be disposed between the diffusion member and the light source.

According to the above, the display device includes the reflecting member having the complementary color to the color of the light emitted from each light emitting device. The display device combines the lights emitted from the light emitting devices to generate the white color light. Thus, the display device may have uniform display quality.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
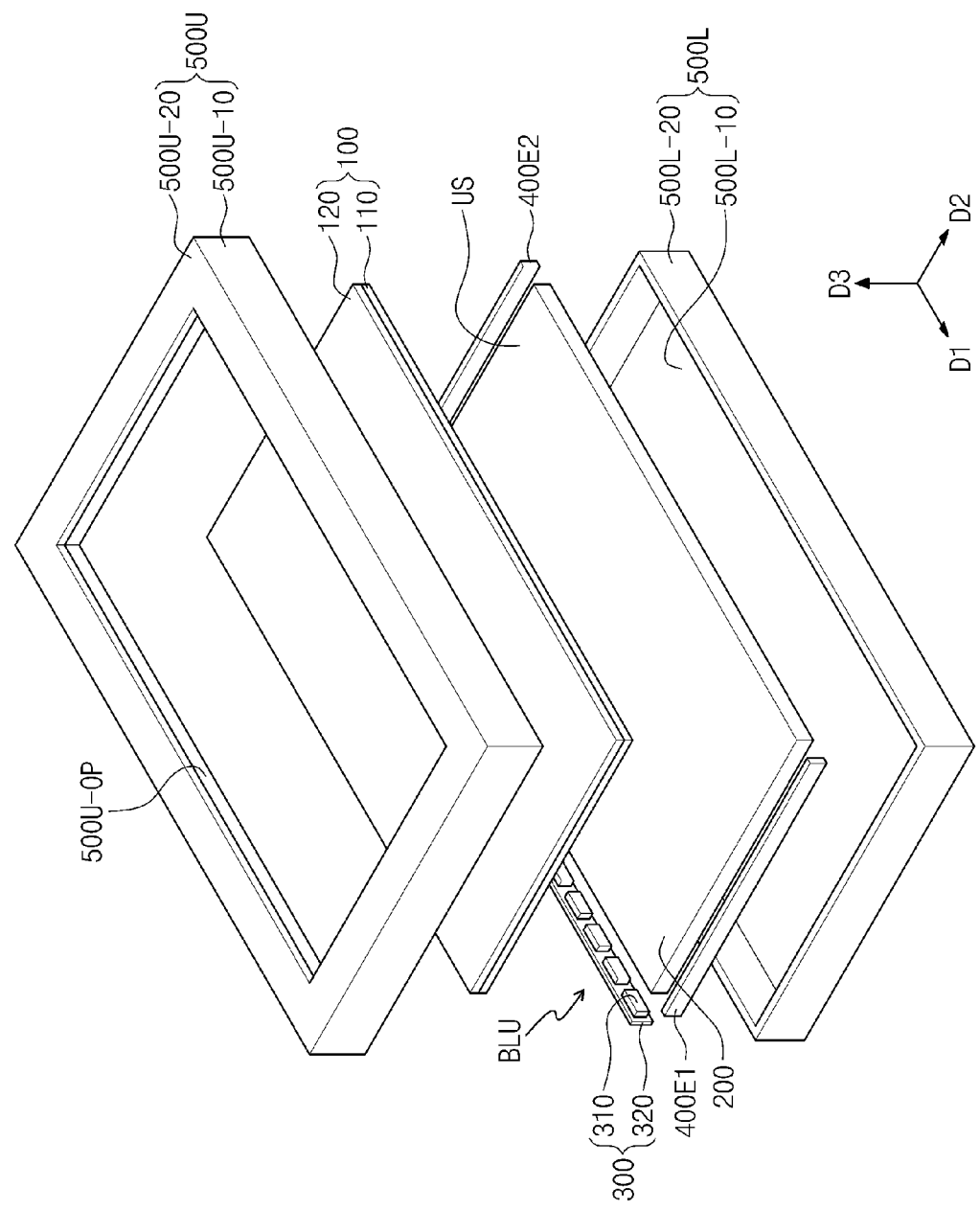
FIG. 1 is an exploded perspective view showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is an exploded perspective view showing a display device according to an exemplary embodiment of the invention.

Referring to FIG. 1, a display device includes a display panel 100, a backlight unit BLU and protective members 500U and 500L.

The display panel 100 receives a light from the backlight unit BLU and displays an image using the light. In exemplary embodiments, the display panel 100 is a transmissive type display panel or a transflective type display panel such as a liquid crystal display panel, an electrophoretic display panel or an electrowetting display panel. However, the invention is not limited thereto, and the display panel 100 may be various types of display panels.

In the illustrated exemplary embodiment, the liquid crystal display panel will be described as the display panel 100. The liquid crystal display panel 100 includes a first substrate 110, a second substrate 120, and a liquid crystal layer (not shown) interposed between the first substrate 110 and the second substrate 120.

The liquid crystal display panel includes a display area and a non-display area surrounding the display area. The image is displayed through the display area and not displayed through the non-display area. The liquid crystal display panel includes a plurality of pixels arranged in the display area.

The backlight unit BLU is disposed under the display panel 100 and provides the light to the display panel 100. The backlight unit BLU includes a light guide plate 200, a light source 300 disposed adjacent to one side of the light guide plate 200, and a plurality of reflecting members 400E1 and 400E2.

The light guide plate 200 is disposed under the display panel 100. The light guide plate 200 guides light provided from the light source 300 to the display panel 100. The light guide plate 200 includes an exit surface US from which the light exits toward the display panel 100 and a rear surface (not shown) facing the exit surface US.

The light guide plate 200 includes a plurality of side surfaces. The side surfaces connect the exit surface US and the rear surface. The side surfaces include first and fourth side surfaces 200-1 and 200-4 (refer to FIG. 2), which face each other in a second direction D2, and second and third side surfaces 200-2 and 200-3 (refer to FIG. 2), which face each other in a first direction D1 crossing the second direction D2.

The second side surface 200-2 is connected between one end of the first side surface 200-1 and one end of the fourth side surface 200-4, and the third side surface 200-3 is connected between the other end of the first side surface 200-1 and the other end of the fourth side surface 200-4. The side surfaces include at least one light incident surface.

As shown in FIG. 1, the first side surface 200-1 faces the light source 300. Accordingly, in the illustrated exemplary embodiment, the first side surface 200-1 will be also referred to as the light incident surface, but it should not be limited thereto or thereby.

The light source 300 is disposed to face the first side surface 200-1 of the light guide plate 200 and provides the light to the light guide plate 200. The light source 300 includes a plurality of light emitting units 310 and a circuit board 320 to apply electrical signals to the light emitting units 310. Although not shown in figures, the circuit board 320 includes wirings to transmit the electrical signals.

The light source 300 generates a light having a first color and a light having a second color different from the first color. The light source 300 combines the light with the first color and the light with the second color to generate a light having a white color. This will be described in detail later.

The backlight unit BLU includes the reflecting members 400E1 and 400E2 disposed to face two opposing side surfaces of the light guide plate 200. The reflecting members 400E1 and 400E2 includes a first reflecting member 400E1 and a second reflecting member 400E2.

The first reflecting member 400E1 is disposed adjacent to the second side surface 200-2 of the light guide plate 200. In the exemplary embodiment, the first reflecting member 400E1 faces the second side surface 200-2. The first reflecting member 400E1 compensates for the color of the light incident to the light guide plate 200 by the light emitting unit 310 disposed nearest to the first reflecting member 400E1 among the light emitting units 310.

The second reflecting member 400E2 is disposed adjacent to the third side surface 200-3 of the light guide plate 200. In the exemplary embodiment, the second reflecting member 400E2 faces the third side surface 200-3. Although not shown in FIG. 1, the second reflecting member 400E2 compensates for the color of the light incident to the light guide plate 200 by the light emitting unit 310 disposed nearest to the second reflecting member 400E2 among the light emitting units 310.

The protective members 500L and 500U include a first protective member 500L disposed under the backlight unit BLU and a second protective member 500U disposed on the display panel 100. The first and second protective members 500L and 500U are coupled to each other to accommodate the display panel 100 and the backlight unit BLU. The first and second protective members 500L and 500U include metal or plastic.

The first protective member 500L accommodates the backlight unit BLU. The first protective member 500L includes a bottom portion 500L-10 and a plurality of sidewall portions 500L-20 bent from and extended from the bottom portion 500L-10. In an exemplary embodiment, the bottom portion 500L-10 has a rectangular shape, for example, and the first protective member 500L includes four sidewall portions. However, the invention is not limited thereto, and the bottom portion 500L-10 may have various types of shapes.

The second protective member 500U is disposed on the display panel 100 to cover an edge of the display panel 100. The second protective member 500U is provided with an opening portion 500U-OP defined therethrough to expose the display area.

In the exemplary embodiment, the second protective member 500U has a rectangular frame shape when viewed in a plan view. However, the invention is not limited thereto, and the second protective member 500U may have various types of shapes. The second protective member 500U is configured to include four parts. The four parts are integrally provided with each other or assembled with each other. Each of the four parts includes a sidewall portion 500U-10 and a front surface portion 500U-20 bent from the sidewall portion 500U-10. The opening portion 500U-OP is defined by the front surface portions 500U-20 of the four parts.

Figure 2:
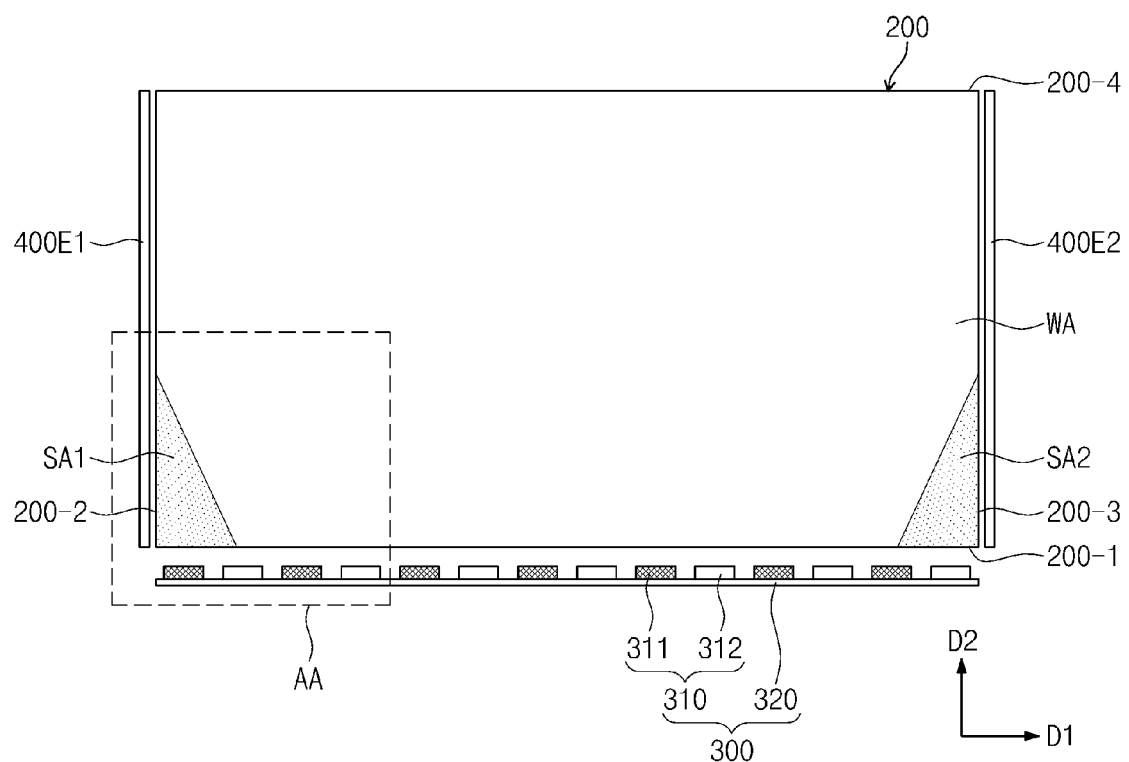
FIG. 2 is a plan view showing an exemplary embodiment of a backlight unit according to the invention.
Figure 3:
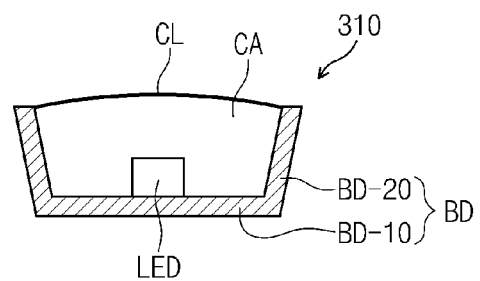
FIG. 3 is a cross-sectional view showing a light emitting unit shown in FIG. 2.

FIG. 2 is a plan view showing the backlight unit BLU according to an exemplary embodiment of the invention and FIG. 3 is a cross-sectional view showing the light emitting unit shown in FIG. 2. For the convenience of explanation, the first and second reflecting members 400E1 and 400E2 are disposed to be spaced apart from the light guide plate 200.

Referring to FIG. 2, the light source 300 is disposed to face the first side surface 200-1 of the light guide plate 200. The light source 300 includes the light emitting units 310. In FIG. 2, each light emitting unit 310 includes one light emitting device.

Referring to FIG. 3, each of the light emitting units 310 includes one light emitting device. Each light emitting unit 310 includes the light emitting device LED and a body portion BD.

In exemplary embodiments, the light emitting device LED may be, but not limited to, a light emitting diode, a laser diode, or a solid laser, for example. In the illustrated exemplary embodiment, the light emitting diode will be described as the light emitting device, but it should not be limited thereto or thereby.

The body portion BD includes a mounting portion BD-10 on which the light emitting device LED is disposed (e.g., mounted) and a sidewall portion BD-20 bent upward from the mounting portion BD-10. The sidewall portion BD-20 is provided along around the light emitting device LED to surround the light emitting device LED.

The sidewall portion BD-20 allows the light emitted from the light emitting device LED to travel through the upper portion of the light source 300. The body portion BD effectively prevents the light emitted from the light emitting device LED from leaking to the outside of the light source 300. Accordingly, the sidewall portion BD-20 has a height higher than that of the light emitting device LED.

Although not shown in figures, a reflective metal layer may be disposed on an inner surface of the sidewall portion BD-20, which faces the light emitting device LED, and the mounting surface on which the light emitting device LED is disposed. The reflective metal layer improves a condensing rate of the light emitted from the light emitting device LED. In an exemplary embodiment, the body portion BD may include a plastic material, and the reflective metal layer may include silver, gold or copper, for example. However, the invention is not limited thereto and the body portion BD and the reflective metal layer may include other materials.

As shown in FIG. 3, an inner space CA defined by the body portion BD may be filled with a molding agent to protect the light emitting device LED. In addition, a cover portion CL is further provided on the body portion BD to cover the light emitting device LED. The cover portion CL protects the light emitting device LED. The cover portion CL includes a transparent material having a high transmittance to effectively reduce a loss in amount of the light emitted from the light emitting device LED.

The light emitting units 310 are arranged along the first direction D1 in one line. The light emitting units 310 are configured to include a first light emitting unit 311 to emit the light having the first color and a second light emitting unit 312 to emit the light having the second color. The first light emitting unit 311 and the second light emitting unit 312 are alternately arranged with each other.

The first light emitting unit 311 is disposed at a position corresponding to the one end of the first side surface 200-1 and the second light emitting unit 312 is disposed at a position corresponding to the other end of the first side surface 200-1. The other end of the first side surface 200-1 is placed at a position extended from the one end of the first side surface 200-1 along the first direction D1.

The second side surface 200-2 is extended from the one end of the first side surface 200-1 along the second direction D2. The third side surface 200-3 is extended from the other end of the first side surface 200-1 along the second direction D2. Thus, the first light emitting unit 311 disposed at the position corresponding to the one end of the first side surface 200-1 is adjacent to the second side surface 200-2, and the second light emitting unit 312 disposed at the position corresponding to the other end of the first side surface 200-1 is adjacent to the third side surface 200-3.

As shown in FIG. 2, the light guide plate 200 includes a plurality of non-overlapping areas SA1 and SA2 and an overlapping area WA disposed adjacent to the non-overlapping areas SA1 and SA2 on the exit surface US (refer to FIG. 1) which may be flat.

The non-overlapping areas SA1 and SA2 include a first non-overlapping area SA1 and a second non-overlapping area SA2. The first non-overlapping area SA1 is defined at a corner portion at which the one end of the first side surface 200-1 meets a portion of the second side surface 200-2. The second non-overlapping area SA2 is defined at a corner portion at which the other end of the first side surface 200-1 meets a portion of the third side surface 200-3.

Figure 4:
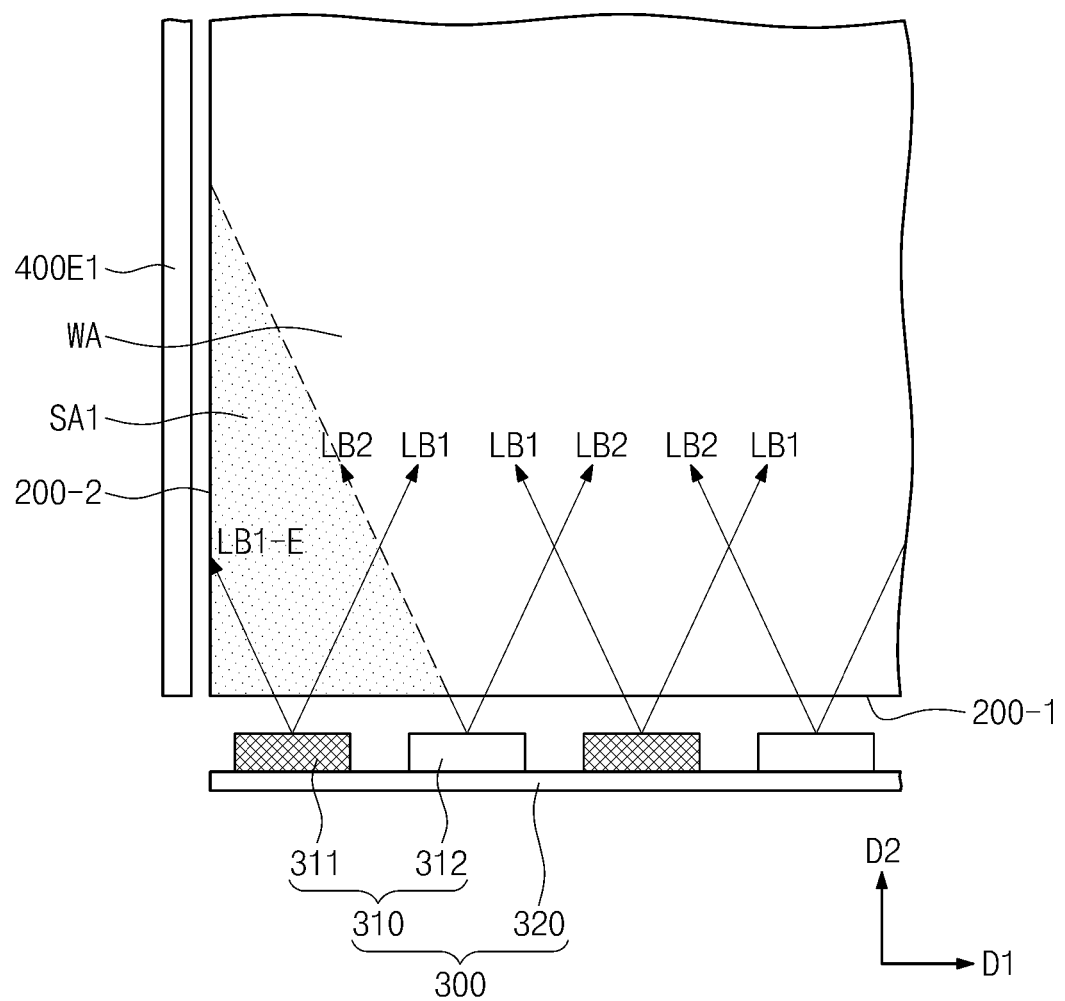
FIG. 4 is an enlarged plan view showing a portion AA shown in FIG. 2.
Figure 5:
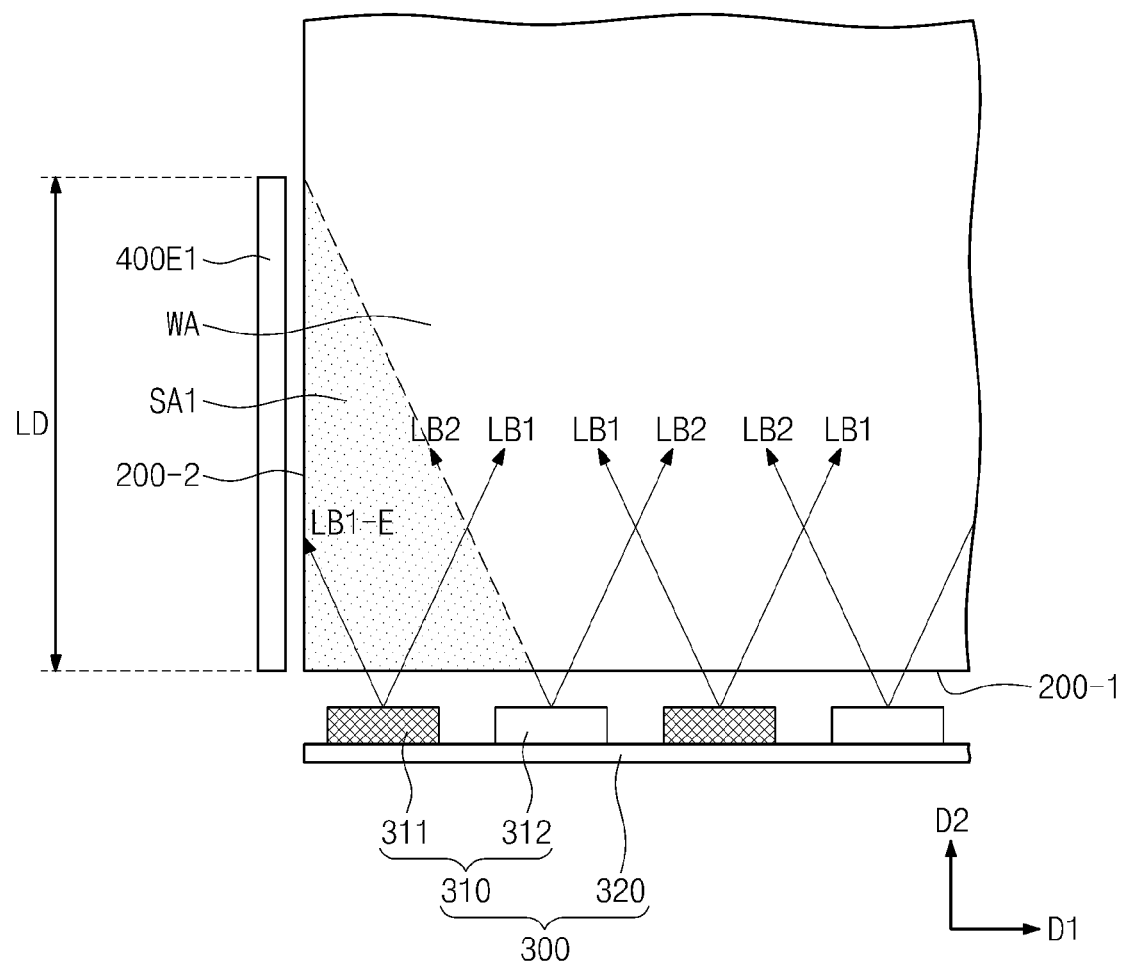
FIG. 5 is a plan view showing another exemplary embodiment of a backlight unit according to the invention.

FIG. 4 is an enlarged plan view showing a portion AA shown in FIG. 2, and FIG. 5 is a plan view showing a backlight unit according to another exemplary embodiment of the invention.

Referring to FIGS. 4 and 5, the light emitting units 310 provide the lights to the light guide plate 200. Each light has independent beam angle and is irradiated onto the first side surface 200-1 of the light guide plate 200.

FIGS. 4 and 5 show a path LB1 (hereinafter, also referred to as first optical path) of the light having the first color (hereinafter, also referred to as first color light) and a path LB2 (hereinafter, also referred to as second optical path) of the light having the second color (hereinafter, also referred to as second color light). The first optical path LB1 and the second optical path LB2 independently exist. The first optical path LB1 corresponds to an outermost boundary of the first color light and the second optical path LB2 corresponds to an outermost boundary of the second color light.

As shown in FIGS. 4 and 5, the first optical path LB1 and the second optical path LB2 are overlapped with each other in the overlapping area WA. Therefore, the first color light and the second color light are combined with each other in the overlapping area WA in which the first and second optical paths LB1 and LB2 are overlapped with each other. Since the first color light and the second color light are combined with each other, the white light is generated in the overlapping area WA.

The second color light traveling along the second optical path LB2 is not provided to the first non-overlapping area SA1, and thus the first color light and the second color light are not combined with each other in the first non-overlapping area SA1. Consequently, only the first color light generated by the first light emitting unit 311 is irradiated to the first non-overlapping area SA1.

As described above, the display device includes the first reflecting member 400E1 disposed on the second side surface 200-2 of the light guide plate 200. The first reflecting member 400E1 is disposed adjacent to the first light emitting unit 311.

In the illustrated exemplary embodiment, the first reflecting member 400E1 has a complementary color to the color, i.e., the first color, of the light generated by the adjacent light emitting device LED of the light emitting unit 310 thereto among the light emitting units 310 disposed adjacent to the first side surface 200-1.

The first color light emitted from the first light emitting unit 311 disposed at the one end of the first side surface 200-1 is irradiated to the light guide plate 200 along the first optical path LB1. The first color light irradiated to the light guide plate 200 has an optical path LB1-E to travel to the first reflecting member 400E1. The light traveling to the first reflecting member 400E1 along the optical path LB1-E is reflected by the first reflecting member 400E1 and travels to inside of the light guide plate 200 due to the reflection on the first reflecting member 400E1.

The light traveling to the first reflecting member 400E1 along the optical path LB1-E is combined with the light having the complementary color to the first color by the first reflecting member 400E1. That is, the first reflecting member 400E1 allows the white color light to be irradiated to the first non-overlapping area SA1.

Although not shown in the drawings, the same effect as that occurring in the first non-overlapping area SA1 occurs in the second non-overlapping area SA2. As shown in FIG. 2, the second light unit 312 is disposed adjacent to the other end of the first side surface 200-1. Accordingly, only the second color light emitted from the second light emitting unit 312 is provided to the second non-overlapping area SA2.

The second reflecting member 400E2 is disposed on the third side surface 200-3 adjacent to the other end of the first side surface 200-1. The second reflecting member 400E2 has a complementary color to the color, i.e., the second color, of the light generated by the adjacent light emitting device LED of the light emitting unit 310 thereto among the light emitting units 310 disposed adjacent to the first side surface 200-1.

A portion of the first color light irradiated to the light guide plate 200 by the second light emitting unit 312 disposed adjacent to the other end of the first side surface 200-1 is provided to the second reflecting member 400E2. The light (not shown) traveling to the second reflecting member 400E2 is reflected by the second reflecting member 400E2 and travels to inside of the light guide plate 200 due to the reflection on the second reflecting member 400E2.

The second color light traveling to the second reflecting member 400E2 is combined with the complementary color to the second color. Accordingly, the second reflecting member 400E2 allows the white light to be irradiated to the second non-overlapping area SA2.

As shown in FIG. 5, the first and second reflecting members 400E1 and 400E2 may have various lengths. Each of the first and second reflecting members 400E1 and 400E2 may have a length LD to cover each portion of the second and third side surfaces 200-2 and 200-3.

In an exemplary embodiment, the length LD of the first reflecting member 400E1 may be less than a length of the second side surface 200-2 and cover at least the first non-overlapping area SA1 of the second side surface 200-2. In addition, although not shown in figures, the length LD of the second reflecting member 400E2 may be less than a length of the third side surface 200-3 and cover at least the second non-overlapping area SA2 of the third side surface 200-3.

Figure 6:
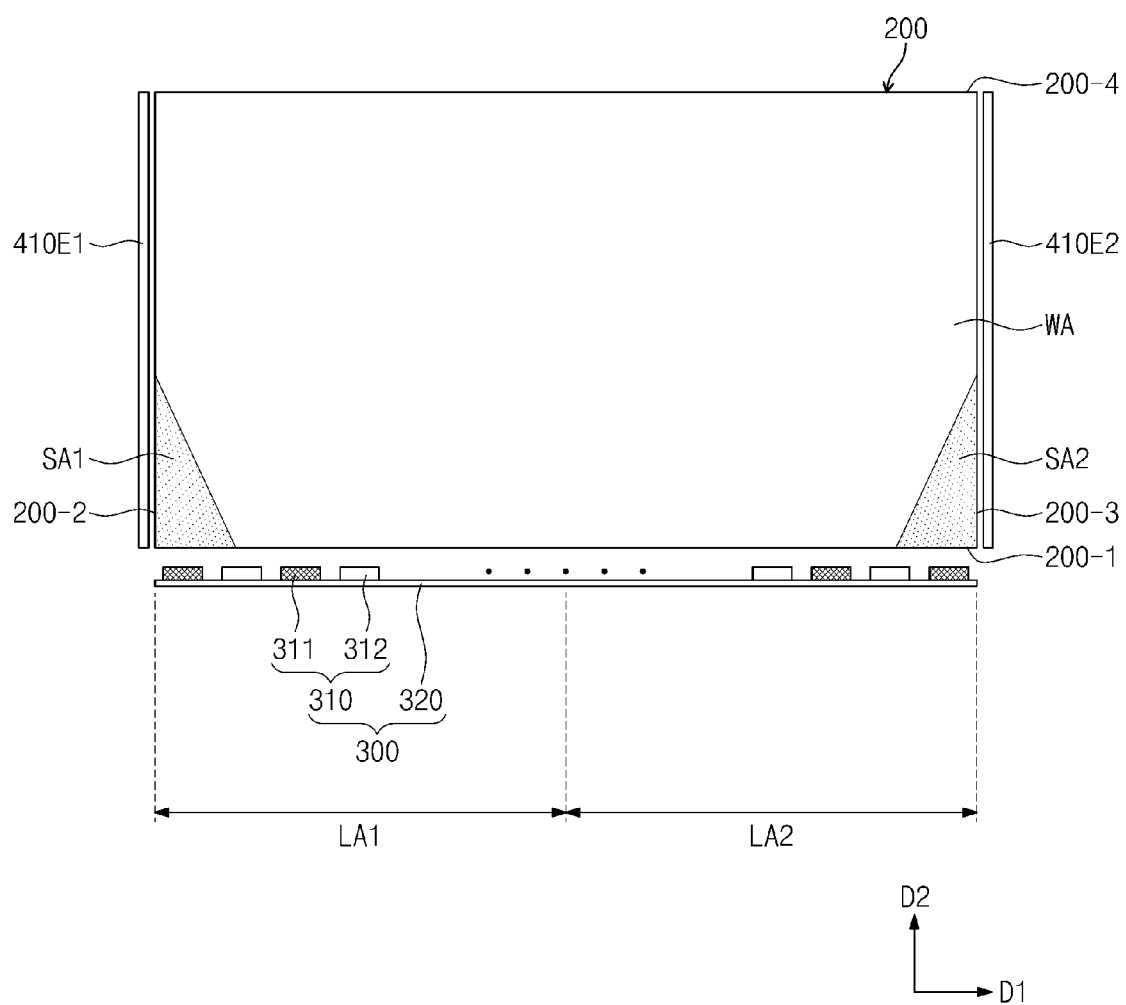
FIG. 6 is a plan view showing another exemplary embodiment of a backlight unit according to the invention.

FIG. 6 is a plan view showing a backlight unit according to another exemplary embodiment of the invention. In FIG. 6, an exemplary embodiment of the invention has different point in orientation of light emitting units 310 included in a light source 300 from the exemplary embodiment disclosed in FIG. 2. Referring to FIG. 6, a backlight unit includes a light guide plate 200, a light source 300, a first reflecting member 410E1 and a second reflection member 410E2.

The light source 300 is disposed adjacent to the first side surface 200-1 of the light guide plate 200. The light source 300 includes a plurality of light emitting units 310 and a circuit board 320 that applies electrical signals to the light emitting units 310. In the exemplary embodiment, the light emitting units 310 are arranged in one line along the first direction D1 and include a first light emitting unit 311 and a second light emitting unit 312, which are alternately arranged with each other.

In the illustrated exemplary embodiment, the light emitting units 310 that emit lights having the same color are respectively disposed at the one end and the other end of the first side surface 200-1. In the exemplary embodiment, as shown in FIG. 6, the first light emitting unit 311 is disposed to corresponding to the one end and the other end of the first side surface 200-1, and the second light emitting unit 312 and the first light emitting unit 311 are alternately arranged with each other between the first light emitting unit 311 disposed adjacent to the one end of the first side surface 200-1 and the first light emitting unit 311 disposed adjacent to the other end of the first side surface 200-1, for example. The light emitting devices LED (refer to FIG. 3) disposed closest to both ends of the first side surface are same.

In the exemplary embodiment, the light emitting units 311 and 312 of the light source 300 are arranged in a first arrangement area LA1 and a second arrangement area LA2. The light emitting units 311 and 312 are arranged in an order of the first light emitting unit 311, the second light emitting unit 312, the first light emitting unit 311 and the second light emitting unit 312 in the first arrangement area LA1 from the one end of the first side surface 200-1 to a point at which the first arrangement area LA1 meets the second arrangement area LA2 along the first direction D1.

Differently, the light emitting units 311 and 312 are arranged in an order of the second light emitting unit 312, the first light emitting unit 311, the second light emitting unit 312 and the first light emitting unit 311 in the second arrangement area LA2 from the point at which the first arrangement area LA1 meets the second arrangement area LA2 to the other end of the first side surface 200-1. Thus, although not shown in figures, the same light emitting units among the first and second light emitting units 311 and 312 may be disposed to be adjacent to each other at the point at which the first arrangement area LA1 meets the second arrangement area LA2. That is, the first light emitting units 311 or the second light emitting units 312 may be disposed to be adjacent to each other at the point the first arrangement area LA1 meets the second arrangement area LA2.

The first reflecting member 410E1 is disposed adjacent to the one end of the first side surface 200-1 and has a complementary color to that of the light emitted from the light emitting unit 310 disposed adjacent to the first reflecting member 410E1. The second reflecting member 410E2 is disposed adjacent to the other end of the first side surface 200-1 and has a complementary color to that of the light emitted from the light emitting unit 310 disposed adjacent to the second reflecting member 410E2.

In this exemplary embodiment of FIG. 6, both of the light emitting unit 310 disposed adjacent to the first reflecting member 410E1 and the light emitting unit 310 disposed adjacent to the second reflecting member 410E2 are the same. Therefore the first reflecting member 410E1 and the second reflecting member 410E2 have the same colors, for instance, a complementary color to the first color.

Figure 7:
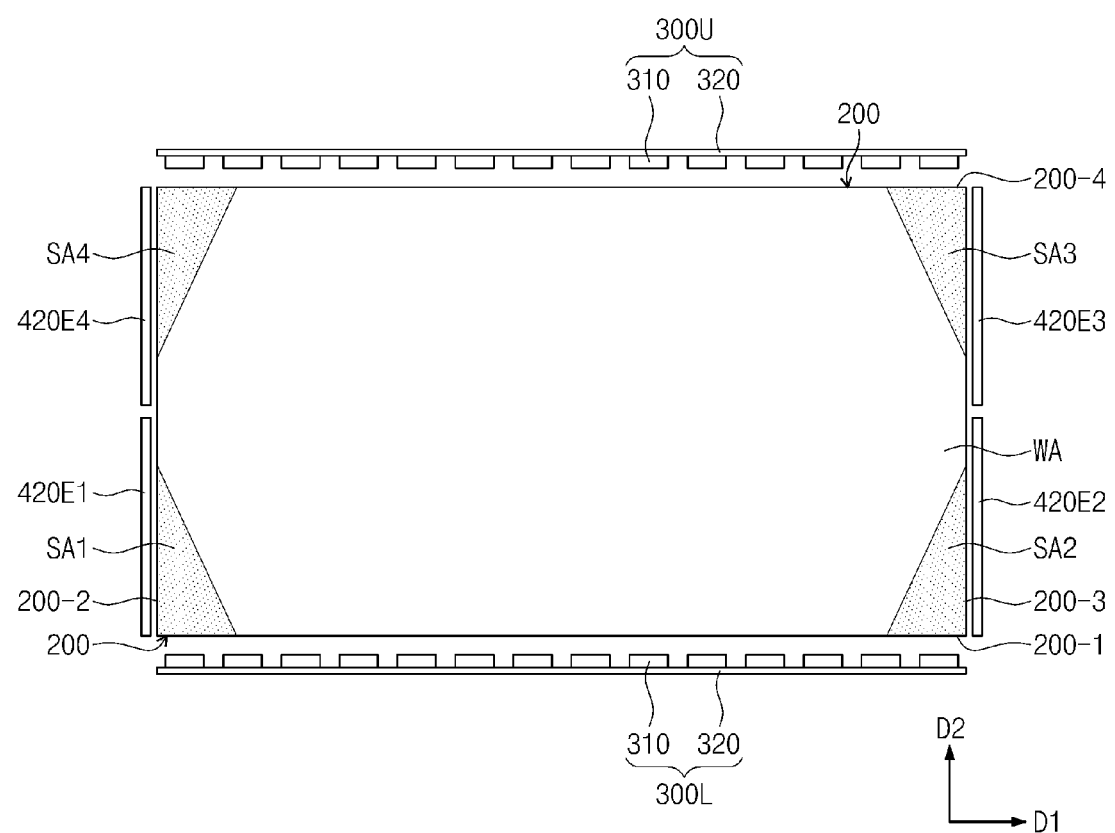
FIG. 7 is a plan view showing another exemplary embodiment of a backlight unit according to the invention.

FIG. 7 is a plan view showing a backlight unit according to another exemplary embodiment of the invention.

Referring to FIG. 7, the display device includes a plurality of light sources 300U and 300L respectively disposed at both sides of the light guide plate 200 to face each other. For the convenience of explanation, the light emitting units 310 are shown without distinction of first and second light emitting units 311 and 312.

As shown in FIG. 7, the light sources are disposed respectively adjacent to a first side surface 200-1 and a fourth side surface 200-4 facing the first side surface 200-1 of the light guide plate 200. Each of light sources 300U and 300L includes the light emitting units 310 and provides the lights to the light guide plate 200. The exit surface US includes a plurality of non-overlapping areas SA1, SA2, SA3, SA4 and an overlapping area WA adjacent to the non-overlapping areas SA1, SA2, SA3 and SA4. The non-overlapping areas SA1, SA2, SA3 and SA4 include first, second, third and fourth non-overlapping areas SA1, SA2, SA3 and SA4 respectively disposed at four corners of the light guide plate 200.

Each of the first to fourth non-overlapping areas SA1 to SA4 is irradiated with the light having one color. As described above, the first to fourth non-overlapping areas SA1 to S4 are provided by the light emitting units 310 disposed adjacent to both ends of the first side surface 200-1 and the light emitting units 310 disposed adjacent to both ends of the fourth side surface 200-4.

The display device includes a plurality of reflecting members, e.g., first, second, third and fourth reflecting members 420E1, 420E2, 420E3 and 420E4. The first to fourth reflecting members 420E1, 420E2, 420E3 and 420E4 are disposed on the second side surface 200-2 and the third side surface 200-3.

The first and fourth reflecting members 420E1 and 420E4 are disposed on the second side surface 200-2. The first reflecting member 420E1 covers the first non-overlapping area SA1 and the fourth reflecting member 420E4 covers the fourth non-overlapping area SA4.

The second and third reflecting members 420E2 and 420E3 are disposed on the third side surface 200-3. The second reflecting member 420E2 covers the second non-overlapping area SA2 and the third reflecting member 420E3 covers the third non-overlapping area SA3.

The first reflecting member 420E1 is disposed adjacent to the one end of the first side surface 200-1 and has a complementary color to that of the light emitted from the light emitting unit 310 disposed adjacent to the first reflecting member 420E1. The second reflecting member 420E2 is disposed adjacent to the other end of the first side surface 200-1 and has a complementary color to that of the light emitted from the light emitting unit 310 disposed adjacent to the second reflecting member 420E2.

In addition, the fourth reflecting member 420E4 is disposed adjacent to one end of the fourth side surface 200-4 and has a complementary color to that of the light emitted from the light emitting unit 310 disposed adjacent to the fourth reflecting member 420E4. The third reflecting member 420E3 is disposed adjacent to the other end of the fourth side surface 200-4 and has a complementary color to that of the light emitted from the light emitting unit 310 disposed adjacent to the third reflecting member 420E3.

The first reflecting member 420E1 is disposed on the second side surface 200-2 to cover the first non-overlapping area SA1 and the fourth reflecting member 420E4 is disposed on the second side surface 200-2 to cover the fourth non-overlapping area SA4. In an exemplary embodiment, the first and fourth reflecting members 420E1 and 420E4 have different colors from each other.

In addition, in another exemplary embodiment, the first and fourth reflecting members 420E1 and 420E4 may have the same color. Although not shown in figures, when the first and fourth reflecting members 420E1 and 420E4 have the same color, the first and fourth reflecting members 420E1 and 420E4 may be integrally provided with each other and disposed on the second side surface 200-2.

The second reflecting member 420E2 is disposed on the third side surface 200-3 to cover the second non-overlapping area SA2 and the third reflecting member 420E3 is disposed on the third side surface 200-3 to cover the third non-overlapping area SA3. In an exemplary embodiment, the second and third reflecting members 420E2 and 420E3 may have the different colors from each other.

In addition, in another exemplary embodiment, the second and third reflecting members 420E2 and 420E3 may have the same color. Although not shown in figures, when the second and third reflecting members 420E2 and 420E3 have the same color, the second and third reflecting members 420E2 and 420E3 may be integrally provided with each other and disposed on the third side surface 200-3.

In the exemplary embodiment, since the display device includes the first to fourth reflecting members 420E1, 420E2, 420E3 and 420E4, a stain may be effectively prevented from occurring at the corners of the light guide plate 200 even though the light sources 300U and 300L are disposed at the both sides of the light guide plate 200. Therefore, the display device has a uniform brightness, and thus the display quality of the display device may be improved.

Figure 8:
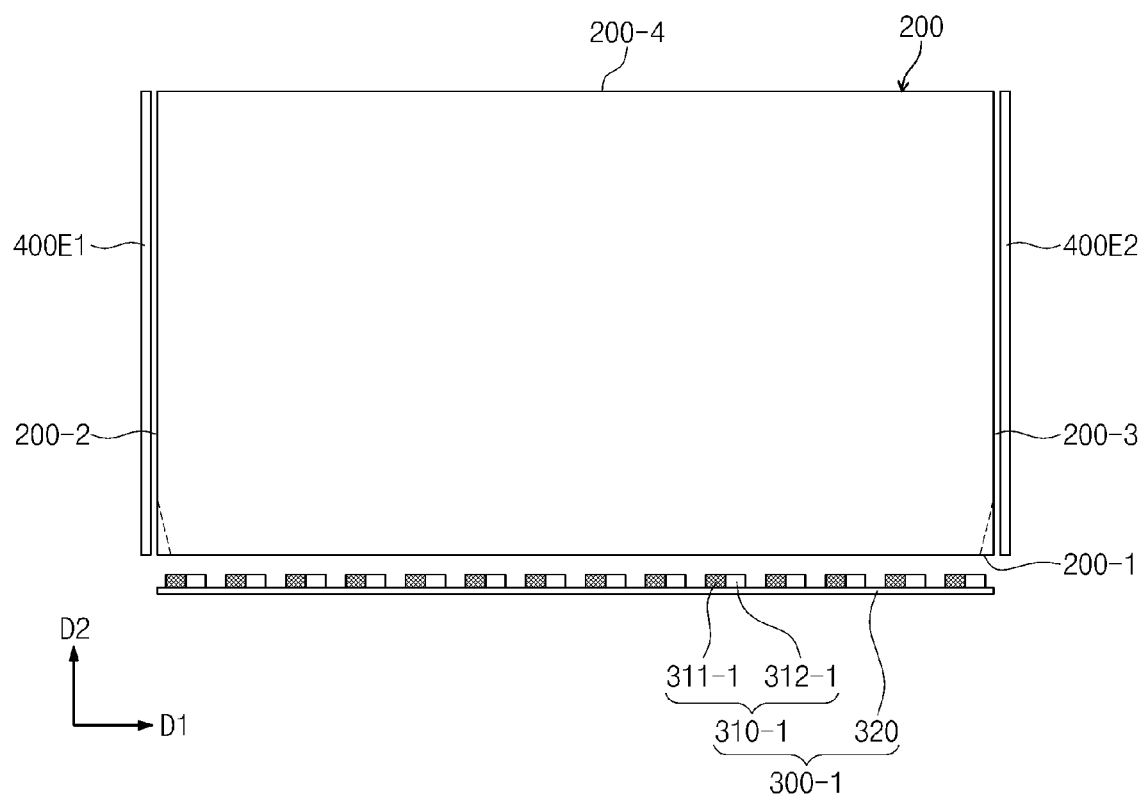
FIG. 8 is a plan view showing another exemplary embodiment of a backlight unit according to the invention.
Figure 9:
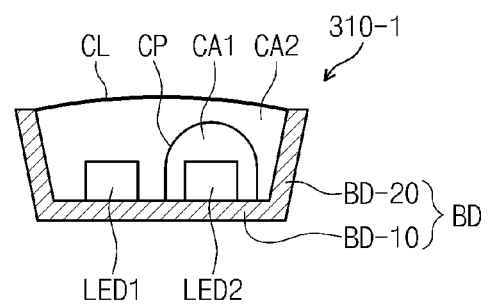
FIG. 9 is a cross-sectional view showing a light emitting unit shown in FIG. 8.

FIG. 8 is a plan view showing a backlight unit according to another exemplary embodiment of the invention and FIG. 9 is a cross-sectional view showing a light emitting unit shown in FIG. 8. In FIGS. 8 and 9, the same reference numerals denote the same elements in FIGS. 1 to 7, and thus detailed descriptions of the same elements will be omitted.

Referring to FIGS. 8 and 9, a light source 300-1 includes a plurality of light emitting units 310-1 arranged in one line. Each of the light emitting units 310-1 includes light emitting devices LED1 and LED2.

Referring to FIG. 9, each of the light emitting units 310-1 includes the light emitting devices LED1 and LED2 and a body portion BD that supports the light emitting devices LED1 and LED2. The light emitting devices LED1 and LED2 are configured to include a first light emitting device LED1 and a second light emitting device LED2.

As described above, the first light emitting device LED1 emits the first color light and the second light emitting device LED2 emits the second color light. Each of the light emitting units 310-1 combines the first color light and the second color light to generate a white color. The colors of the first and second color lights may have various colors. In an exemplary embodiment, the first and second colors may be green and magenta, respectively, for example.

A cap CP is disposed on the second light emitting device LED2 to cover the second light emitting device LED2. A space CA1 defined by the cap CP is filled with a molding agent, e.g., a fluorescent material. In addition, the cap CP may include the fluorescent material. The second color is generated by the combination of second light emitting device LED2 and the fluorescent material.

The first color, the second color and the fluorescent material may have various colors. In an exemplary embodiment, the first light emitting device LED1 emits a green light and the second light emitting device LED2 emits a blue light, for example. In an exemplary embodiment, the fluorescent material that covers the second light emitting device LED2 has a red color, for example.

The body portion BD includes a mounting portion BD-10 on which the first and second light emitting device LED1 and LED2 are disposed and a sidewall portion BD-20 bent upward from the mounting portion BD-10. The sidewall portion BD-20 surrounds the first and second light emitting devices LED1 and LED2. An inner space CA2 defined by the body portion BD may be filled with a molding agent.

The molding agent includes the fluorescent material. In an exemplary embodiment, the first and second light emitting devices LED1 and LED2 may emit the blue light, and the molding agent that covers the first and second light emitting devices LED1 and LED2 may include a yellow fluorescent material, for example. In this case, the light emitting unit may generate the white color light using the first and second light emitting devices LED1 and LED2 and the fluorescent material.

In addition, a cover CL is disposed on the body portion BD to cover the first and second light emitting devices LED1 and LED2. The molding agent and the cap protect the first and second light emitting devices LED1 and LED2.

As shown in FIG. 8, the light emitting units 310-1 are arranged in the one line, and the light emitting unit that emits the first color light is disposed closest to the one end of the first side surface 200-1. The light emitting unit that emits the second color light is disposed closest to the other end of the first side surface 200-1.

The first reflecting member 400E1 disposed on the second side surface 200-2 has a complementary color to the color of the light emitted from the light emitting unit disposed closest to the one end of the first side surface 200-1. In addition, the second reflecting member 400E2 disposed on the third side surface 200-3 has a complementary color to the color of the light emitted from the light emitting unit disposed closest to the other end of the first side surface 200-1.

In an exemplary embodiment, as shown in FIG. 8, since the light emitting device disposed closest to the first reflecting member 400E1 in the light emitting unit disposed at the one end of the first side surface 200-1 emits the first color light, the first reflecting member 400E1 may have the complementary color to the first color. In addition, since the light emitting device disposed closest to the second reflecting member 400E2 in the light emitting unit disposed at the other end of the first side surface 200-1 emits the second color light, the second reflecting member 400E2 may have the complementary color to the second color.

However, the arrangement of the light emitting units 310-1 should not be limited thereto or thereby. In an exemplary embodiment, the light emitting units 310-1 may be arranged such that the light emitting units 311-1 emitting the first color light are disposed at both ends of the first side surface 200-1 or the light emitting units 312-1 emitting the second color light are disposed at both ends of the first side surface 200-1. Accordingly, the first and second reflecting members 400E1 and 400E2 may have the same color.

Figure 10:
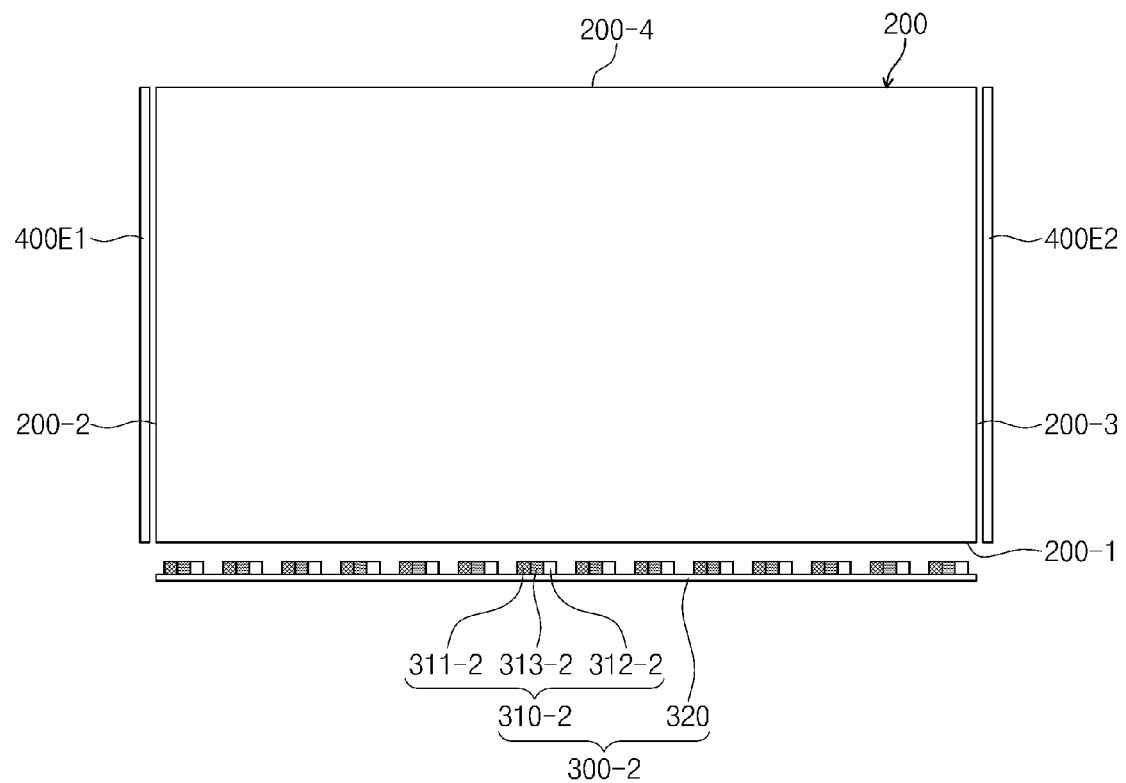
FIG. 10 is a plan view showing another exemplary embodiment of a backlight unit according to the invention.

FIG. 10 is a plan view showing a backlight unit according to another exemplary embodiment of the invention. In FIG. 10, the same reference numerals denote the same elements in FIGS. 1 to 9, and thus detailed descriptions of the same elements will be omitted.

Referring to FIG. 10, a light source 300-2 includes light emitting units each emitting plural color lights. FIG. 10 shows the light emitting units 310-2 each of which emits three color lights. The light source 300-2 emits the white color light by combining first, second and third color lights.

Each of the light emitting units 310-2 includes an area 311-2 in which the first color light is generated, an area 312-2 in which the second color light is generated and an area 313-2 in which the third color light is generated. The area 313-2 is disposed between the area 311-2 and the area 312-2.

As shown in FIG. 10, the first reflecting member 400E1 has a complementary color to a color of the light emitted from the light emitting device of the light emitting units, which is closest to the one end of the first side surface 200-1. In addition, the second reflecting member 400E2 has a complementary color to a color of the light emitted from the light emitting device of the light emitting units, which is closest to the other end of the first side surface 200-1.

The light source 300-2 includes a plurality of light emitting units 310-2 each including light emitting devices LED (refer to FIG. 3) arranged in various orders. Therefore, each of the first and second reflecting members 400E1 and 400E2 may have the complementary color to the first color, the complementary color to the second color or the complementary color to the third color.

Figure 11:
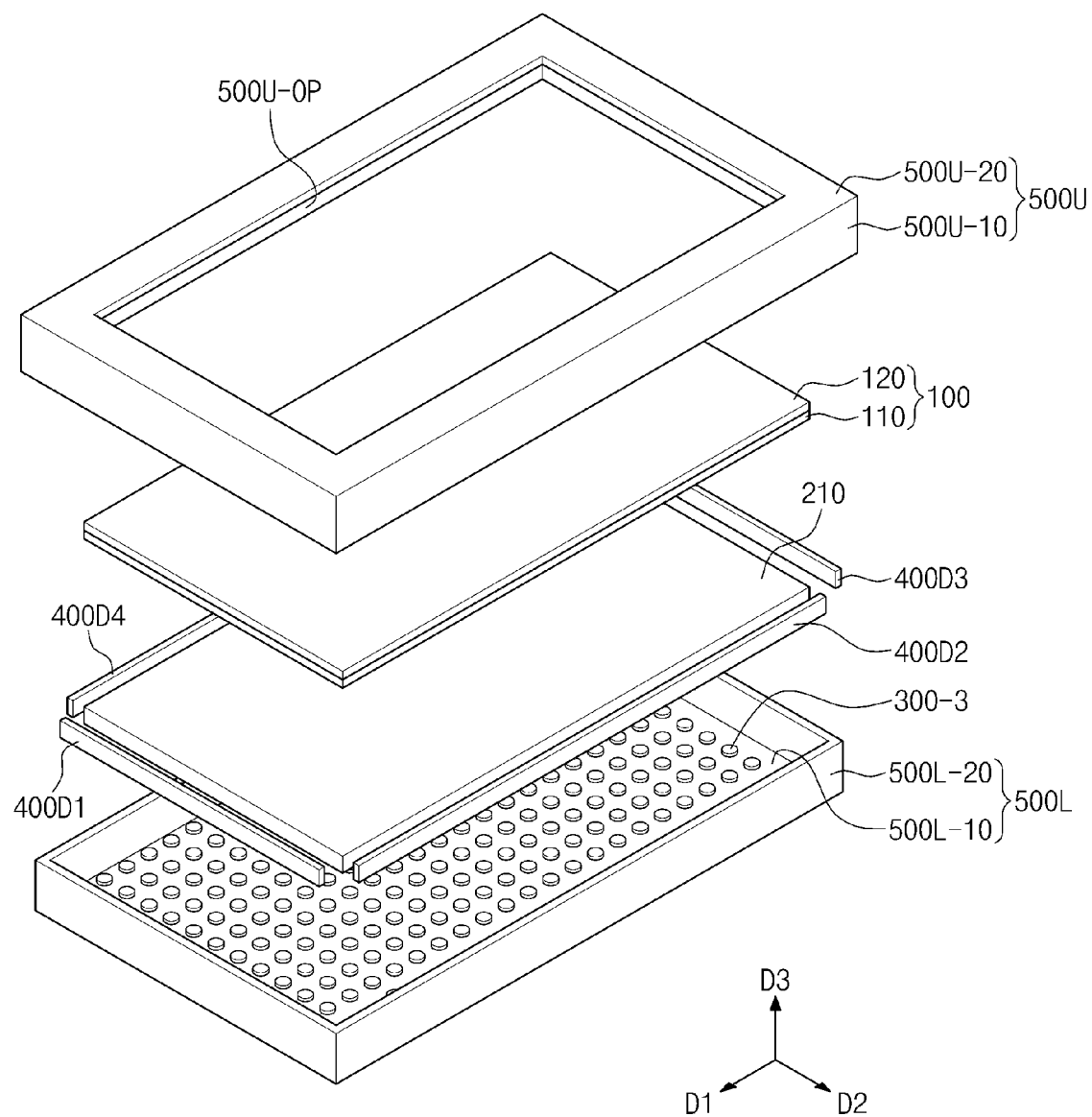
FIG. 11 is an exploded perspective view showing another exemplary embodiment of a display device according to the invention.
Figure 12:
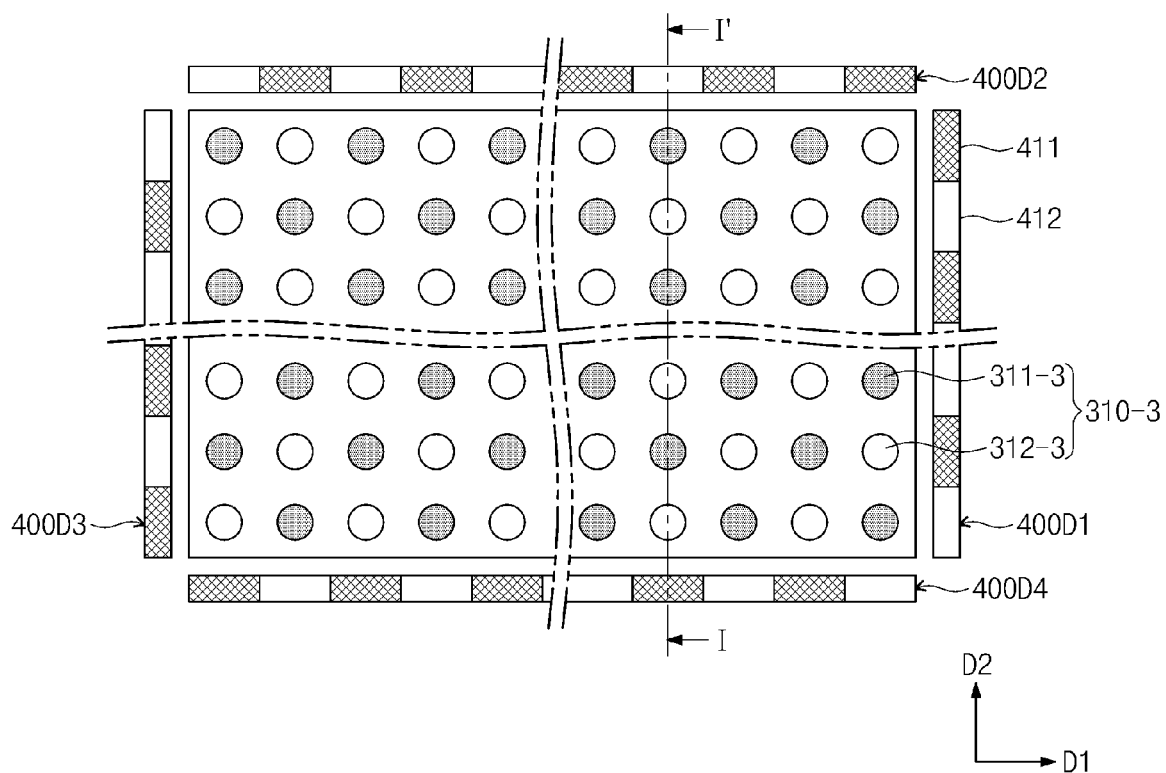
FIG. 12 is a view showing a portion of the display device shown in FIG. 11.
Figure 13:
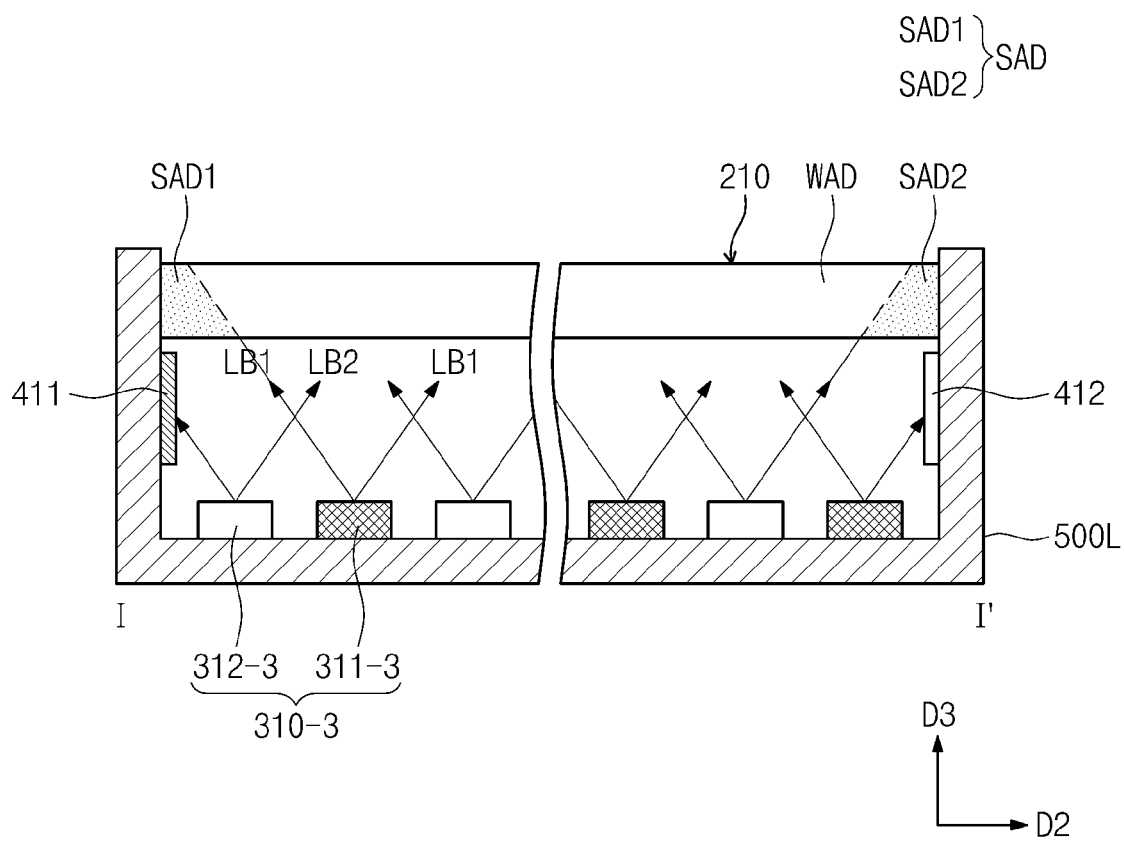
FIG. 13 is a cross-sectional view taken along line I-I of FIG. 12.

FIG. 11 is an exploded perspective view showing a display device according to another exemplary embodiment of the invention, FIG. 12 is a view showing a portion of the display device shown in FIG. 11, and FIG. 13 is a cross-sectional view taken along line I-I' of FIG. 12. In FIGS. 11 to 13, the same reference numerals denote the same elements in FIGS. 1 to 10, and thus detailed descriptions of the same elements will be omitted.

Referring to FIG. 11, a display device includes a display panel 100, a light source 300-3, a plurality of reflecting members 400D1, 400D2, 400D3 and 400D4, a diffusion member 210 and protective members 500U and 500L. The display panel 100 and the protective members 500U and 500L will be described with reference to FIG. 1.

As shown in FIGS. 11 and 12, the light source 300-3 is disposed under the display panel 100 and the diffusion member 210 and accommodated in the lower protective member 500L. The light source 300-3 includes a plurality of light emitting units 310-3.

The light emitting units 310-3 are disposed under the display panel 100 to provide the light to the display panel 100. The display device further includes the diffusion member 210. In this case, the light emitting units 310-3 are disposed under the diffusion member 210 to provide the light to the diffusion member 210.

Each of the light emitting units 310-3 includes a plurality of light emitting devices as a point light source and a circuit board (not shown) that applies electrical signals to the light emitting devices. The circuit board includes wirings to transmit the electrical signals. In this exemplary embodiment, the circuit board connected to each of the light emitting devices is provided as one board.

A number of the light emitting devices in the light emitting units is not constant. In exemplary embodiments shown in FIGS. 11 to 13, each light emitting unit of the light source 300-3 includes one light emitting device.

Referring to FIG. 12, the light emitting units 310-3 comprise a first light emitting unit 311-3 emitting a first color light and a second light emitting unit 312-3 emitting a second color light different from the first color. The first color and the second color provide a white color with combining each other. The first light emitting unit 311-3 and the second light emitting unit 312-3 are alternately arranged with each other.

As shown in FIGS. 11 and 12, the display device includes the reflecting members 400D1, 400D2, 400D3 and 400D4. The reflecting members 400D1, 400D2, 400D3 and 400D4 are provided at around the light source 300-3. Although not shown in figures, the reflecting members are integrally provided with each other by connecting both ends of the reflecting members.

Referring to FIGS. 12 and 13, the light emitting units 310-3 includes the first light emitting unit 311-3 emitting the first color light and the second light emitting unit 312-3 emitting the second color light. The first light emitting unit 311-3 emitting the first color light and the second light emitting units 312-3 emitting the second color light are alternately arranged with each other, and the light emitting units 310-3 emitting different color lights are disposed to be adjacent to each other.

Although not shown in figures, the lower protective member 500L (refer to FIG. 11) may further include a support member (not shown) therein. The support member supports the diffusion member 210. Accordingly, the light emitting units 310-3 is spaced apart from the diffusion member 210 by a predetermined distance.

As shown in FIG. 13, the first color light emitted from the first light emitting unit 311-3 travels along a first optical path LB1 and the second color light emitting from the second light emitting unit 312-3 travels along a second optical path LB2. The first and second optical paths LB1 and LB2 are independent from each other. The first color light and the second color light are combined with each other in the area in which the first and second optical paths LB1 and LB2 are overlapped with each other, and thus the white color light is generated.

The diffusion member 210 includes non-overlapping areas SAD and an overlapping area WAD adjacent to the non-overlapping area SAD with reference to a surface facing the display panel 100. The non-overlapping areas SAD are configured to include first and second non-overlapping areas SAD1 and SAD2 and disposed along an edge of the diffusion member 210. The non-overlapping areas SAD are separated from each other or are integrally provided with each other to surround the edge of the diffusion member 210.

The non-overlapping areas SAD are irradiated with the first color light or the second color light, and the overlapping area WAD is irradiated with the combination of the first and second color lights.

That is, the non-overlapping areas SAD1 and SAD2 are irradiated with only the lights emitted from the light emitting units 310-3 disposed under the non-overlapping areas SAD1 and SAD2. In an exemplary embodiment, only the first color light is irradiated to the first non-overlapping area SAD1 by the first light emitting unit 311-3 disposed under the first non-overlapping area SAD1, and only the second color light is irradiated to the second non-overlapping area SAD2 by the second light emitting unit 312-3 disposed under the second non-overlapping area SAD2.

As shown in FIGS. 11 to 13, the reflecting members 400D1, 400D2, 400D3 and 400D4 are disposed between the diffusion member 210 and the light source 300-3. The reflecting members 400D1, 400D2, 400D3 and 400D4 are disposed along an inner side of the lower protective member 500L and on the light source 300-3. In an exemplary embodiment, a space defined by reflecting members 400D1, 400D2, 400D3 and 400D4 may be wider than the light source 300-3. Each of the reflecting members 400D1, 400D2, 400D3 and 400D4 includes a first reflecting portion 411 and a second reflecting portion 412.

The first reflecting portion 411 receives the second color light and has a complementary color to the second color of the first color light. The first reflecting portion 411 generates the white color light together with the second light emitting unit 312-3 to provide the white color light to the diffusion member 210.

The second reflecting portion 412 receives the first color light and has a complementary color to the first color of the first color light. The second reflecting portion 412 generates the white color light together with the first light emitting unit 311-3 to provide the white color light to the diffusion member 210.

As shown in FIG. 13, the first reflecting portion 411 is disposed under the first non-overlapping area SAD1. The first reflecting portion 411 has the complementary color to the second color of the second color light. Accordingly, the first reflecting portion 411 compensates for the second light emitting unit 312-3 to provide the white color light to the first non-overlapping area SAD1.

In addition, the second reflecting portion 412 is disposed under the second non-overlapping area SAD2. The second reflecting portion 412 has the complementary color to the first color of the first color light. Accordingly, the second reflecting portion 412 compensates for the first light emitting unit 311-3 to provide the white color light to the second non-overlapping area SAD2.

Each of the first and second reflecting portions 411 and 412 has a size enough to cover a corresponding non-overlapping area of the first and second non-overlapping areas SAD1 and SAD2. Although not shown in figures, the first and second reflecting portions 411 and 412 may have different sizes depending on a size of the corresponding non-overlapping area of the first and second non-overlapping areas SAD1 and SAD2. In addition, when only the first light emitting unit 311-3 is disposed at the edge of the light source 300-3, each of the reflecting members 400D1, 400D2, 400D3 and 400D4 includes only the first reflecting portion 412.

Although not shown in figures, the reflecting members 400D1, 400D2, 400D3 and 400D4 may be disposed between the diffusion member 210 and the display panel 100. In this case, each of the reflecting members 400D1, 400D2, 400D3 and 400D4 allow the lights exiting from the diffusion member 210 to be combined with each other, and thus the white color light is irradiated to the display panel 100.

In addition, although not shown in figures, the reflecting members 400D1, 400D2, 400D3 and 400D4 may be disposed at the edge of the diffusion member 210. In this case, the reflecting members 400D1, 400D2, 400D3 and 400D4 allow the lights respectively irradiated to the reflecting members 400D1, 400D2, 400D3 and 400D4 to be combined with each other in the diffusion member 210, and thus the white color light exits from the diffusion member 210.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
a display panel;
a light guide plate which is disposed under the display panel and includes a first side surface, a second side surface connected to one end of the first side surface, and a third side surface connected to the other end of the first side surface;
a first light source disposed to face the first side surface and including a plurality of light emitting devices including a first light emitting device which emits a first color light and a second light emitting device which emits a second color light; and
a first reflecting member disposed on the second side surface and having a complementary color to a color of the light emitted from a light emitting device, which is disposed closest to the one end of the first side surface, among the plurality of light emitting devices.

2. The display device of claim 1, wherein the first light source combines the first color light and the second color light to generate a white color light.

3. The display device of claim 2, wherein the first color light is a green color light and the second color light is a magenta color light.

4. The display device of claim 3, wherein the first light source includes a plurality of light emitting units, and each of the plurality of light emitting units includes the first light emitting device and the second light emitting device.

5. The display device of claim 1, further comprising a second reflecting member disposed on the third side surface and having a complementary color to a color of the light emitted from a light emitting device, which is disposed closest to the other end of the first side surface, among plurality of the light emitting devices.

6. The display device of claim 5, wherein a light emitting device disposed closest to the one end of the first side surface and the light emitting device disposed closest to the other end of the first side surface emit lights having the same color as each other.

7. The display device of claim 5, wherein the first light emitting device is disposed closest to the one end of the first side surface and the second light emitting device is disposed closest to the other end of the first side surface.

8. The display device of claim 1, wherein the first light source further comprises a third light emitting device which emits a third color light different from the first and second color lights.

9. The display device of claim 8, wherein the first light source combines the first color light, the second color light, and the third color light to generate a white color light.

10. The display device of claim 9, wherein the first light source includes a plurality of light emitting units, and each of the plurality of light emitting units includes the first light emitting device, the second light emitting device and the third light emitting device.

11. The display device of claim 1, wherein the first reflecting member is extended from a portion at which the second side surface and the first side surface are connected, to partially cover the second side surface.

12. The display device of claim 1, further comprising a second light source including a plurality of light emitting units,
wherein
the light guide plate further comprises a fourth side surface connected between the second side surface and the third side surface to face the first side surface, and
the second light source is disposed to face the fourth side surface.

13. The display device of claim 12, wherein the first reflecting member is divided into a portion disposed adjacent to the first side surface and a portion disposed adjacent to the fourth side surface.

14. A display device comprising:
an optical member;
a display panel disposed on the optical member; and
a light source disposed under the optical member and including a first light emitting device which emits a first light having a first color and a second light emitting device which emits a second light having a second color different from the first color, and
the optical member comprising:
a diffusion member; and
a reflecting member including:
a first reflecting portion disposed along an edge of the diffusion member to correspond to the first light emitting device and having a complementary color to the first color, and
a second reflecting portion disposed along the edge of the diffusion member to correspond to the second light emitting device and having a complementary color to the second color.

15. The display device of claim 14, wherein the first reflecting portion and the second reflecting portion are alternately arranged with each other.

16. The display device of claim 14, wherein the light source combines the first light having the first color and the second light having the second color to generate a white color light.

17. The display device of claim 16, wherein the first color is a green color and the second color is a magenta color.

18. The display device of claim 14, wherein
the light source further includes a third light emitting device which emits a third light having a third color different from the first and second colors, and
the light source combines the first light having the first color, the second light having the second color, and the third light having the third color to generate a white color light.

19. The display device of claim 14, wherein each of the first light emitting device and the second light emitting device is provided in a plural number, and each of the first light emitting devices is disposed between adjacent second light emitting devices.

20. The display device of claim 14, wherein the reflecting member is disposed between the diffusion member and the light source.

* * * * *